Patented Oct. 27, 1953

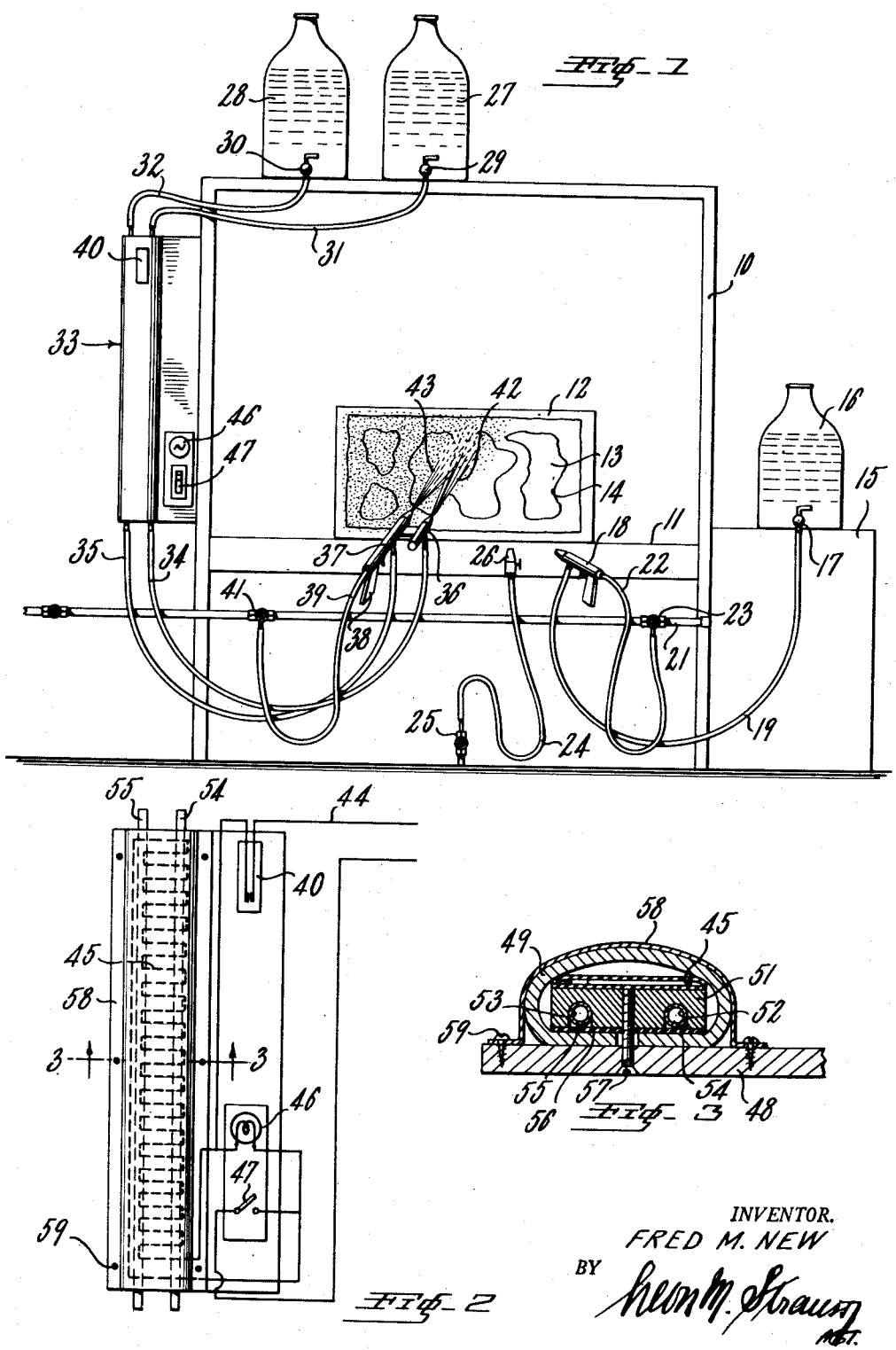

2,657,097

UNITED STATES PATENT OFFICE 2,657,097

PROCESS AND MEANS FOR METALLIZING NONCONDUCTIVE BASES

Fred M. New, New York, N. Y.

Application September 2, 1949, Serial No. 113,724

1 Claim. (Cl. 299—86)

This invention relates to an apparatus for preparing an electrically conductive layer or layers of (precious or non-precious) metallic substances, such as silver, cadmium, nickel, copper, etc. on a non-conductive base made from wax, semi-plastic, plastic, glass and the like which forms a mold or plate which may be used for an ensuing metal electro-depositing operation.

It is an object of the present invention to provide means affording an improved apparatus for preparing wax, plastic and like bases for electroplating and like operation in a simple, highly efficient, inexpensive and expeditious manner, requiring only seconds for its performance; thereby avoiding the use of graphite which heretofore consumed enormous time in order to be evenly spread on for adhesion to the wax or like base.

It is another object of the present invention to provide means facilitating the construction of an efficacious apparatus for metallizing wax, semi-plastic, plastic and like electrically non-conductive bases for an electro-plating operation whereby to obtain a fine, metallic or like conductive layer on the base or parts thereof, which layer is extremely thin, of uniform thickness throughout the entire area of its deposit and ensures sharp and clear contours.

It is a further object of the present invention to provide means enabling the operator to employ spray gun or guns for the discharge of finely divided and preheated liquids which are preferably mixed adjacent the surface or point of application of the wax or like base at an economically advantageous and critical working temperature which affords savings of expensive metal substances (for example silver) and brings about best, uniform and speedy results.

Other objects of the present invention are to provide an apparatus for preparing wax, semi-plastic and like base plates for electro-plating or metal deposit thereon, which is of simple construction, inexpensive to manufacture, convenient to use, quick and effective in operation and highly efficient.

For other objects and for a better understanding of the invention, reference may be had to the following detailed description taken in connection with the accompanying drawing in which Fig. 1 is an elevational view of the apparatus embodying the features of the present invention and adapted for the carrying out of the process thereof.

Fig. 2 is an elevational view of the heater used for heating the liquids before their application upon the plates, including a diagrammatic showing of the wiring and control means for the heater.

Fig. 3 is an enlarged transverse actional view of the heater taken on line 3—3 of Fig. 2 and looking in the direction of the arrows thereof.

Referring now to the accompanying drawing, there is disclosed a stand or support 10 having a shelf 11 on which a plate 12 carrying a wax, semi-plastic or other electrically non-conductive surface is rested which is to be treated in the manner about to be described. The plate 12 may have on its surface depressions or relief-like formations 13 and contours 14 of any configuration, which are obtained by contact with a hand- or machine-etched pattern plate (not shown), or any other suitable mold.

To one side of the stand 10 there is placed at 15 a container 16 having a spigot 17. This container or bottle 16 supplies a sensitizing agent, such as a solution comprising stannous chloride, which is first applied to the wax or like surface of plate 12 by a spray gun 18 connected to the spigot 17 by a hose 19. The spray gun is operated by air under pressure, supplied from an air line 21. The gun 18 is connected to the air line 21 through a hose 22 from an air valve fitting 23. The sensitizing agent fulfills the purpose of cleaning the surface to be metallized or made conductive, from any undesired particles of the surrounding atmosphere or from any other sources, and to precondition said surface.

Once the sensitizing agent has had an opportunity to work and to contact the non-conductive surface of plate 12, any surplus of the agent will be washed off by water from hose 24 connected to a valve controlled water outlet 25 and having a spray nozzle 26.

Resting upon the top of the stand are two bottles or containers 27 and 28, each of which having, respectively, outlet spigots 29 and 30. These bottles contain spraying liquids which are used together to metallize or silverize the surface of the plate 12 and to thus prepare it for electro-plating or like operation.

One of the bottles contains, for instance, a solution comprising ammonical silver nitrate sufficiently diluted, or other suitable metallic solution, as the case may be, while the other bottle contains an organic or inorganic diluted reducing agent, for instance, liquid formaldehyde. Other reducing agents may be glyxocal, or sodium-hyposulfite, hydrazine, etc.

From each of the respective spigots 29 and 30 extend hose pieces 31 and 32 which lead to an electric heater or heat regulator 33 mounted on a wall of the stand 10. In this heater, the spraying liquids which flow through it by gravity are heated to and substantially maintained at a temperature ranging from 125° F. to 180° F. (a preferred temperature being approximately 150° F.). The respective liquids leave the heater through hose pieces 34 and 35 which are connected, respectively, to spray nozzles 36 and 37 of gun 38. Spray gun 38 receives compressed air through a hose 39 from an air valve fitting 41 in the air line 21. Two separate liquid streams, as indicated, respectively, at 42 and 43 are discharged upon the sensitized surface of the plate 12. The mixing of the solutions is accordingly made adjacent the surface of plate 12.

The gun 38 is held so that the spray nozzles 36 and 37 are a distance of approximately 8 to 10 inches from the plate surface being metallized or silvered. The temperature of the mixed liquids at the plate surface reaches approximately 95° F. and is at least above ordinary room temperature. The working temperature may vary between 90° F. and 110° F.

The temperature of the mixed liquids is reduced by virtue of the compressed air which is added to the spraying liquids and as a result of the atomization of the latter. The aforesaid temperature is critical for this extremely fast and effective metallizing or silverizing step and should be maintained throughout the spraying operation.

In order that the temperature is properly maintained, the heat regulator 33 is arranged intermediate the sources of liquid supply 27, 28 and the spray gun 38. To this end heat regulator 33 is provided with a thermostat 40 in an electric circuit 44 which includes an electric heating wire 45 that extends the full height of the heater and with a pilot lamp 46 to indicate that the heater with thermostat is in use. A control switch 47 is employed to operate this circuit.

The heating unit comprises generally an asbestos base 48 on which is mounted a large asbestos sleeve 49. Within this sleeve 49 is an aluminum or heat storage block 51 having grooves 52 and 53 therein containing, respectively, stainless steel tubes 54 and 55 through which the aforesaid spraying liquids pass to be heated. The aluminum block has a cement covering 56 baked thereon. This block is held in place on the asbestos base by screws 57. On the other side of the block 51 there is provided the heating element 45 which is suitably held in place upon the block 51.

The sleeve 49 is surrounded by a metal cover 53 which serves further to hold the shape of the asbestos sleeve 49 and which is secured by screws 59 to the base 48. The heat from the electric wire is absorbed by and stored in the aluminum block 51 and this block acts as a heat storage or charger and supplies a constant and even flow of heat to the liquids passing through the tubes 54 and 55 embedded in said block.

The liquids are sprayed in approximately equal quantities from the converging nozzles 36 and 37 whereby an even composite deposit of the thus mixed liquids is made upon the surface of the plate 12. When ammonical silver nitrate is employed, a mirrorizing effect may be achieved on a glass or like plate surface treated in accordance with the invention. It is, of course, understood that other metallic compositions containing cadmium or nickel, chromium, etc. may be used for the purposes of the invention.

The arrangement of the heater a predetermined distance from the containers of the liquids serves the purpose of maintaining the concentration of the liquid solution at all times since the passage of the liquids through hoses 31, 32 by gravity prevents any escape of ammonia or of other volatile constituents from the liquid solutions being heated. On the other hand, the temperature of the heater depends on and is regulated according to the critical temperature at which the atomized liquids are discharged from the gun nozzles. Since compressed air is supplied to the heated liquids immediately before atomization thereof, the temperature of the previously heated liquids flowing from the heater toward the nozzles will be reduced to the required working temperature.

It will thus become apparent that one of the principal features of the invention is to uniformly heat the liquids to be sprayed to a predetermined temperature without any loss of volatile constituents contained in these liquids and thereafter reducing this predetermined temperature to a working temperature which is critical and at which the liquids impinge upon the surface being treated.

Another feature is the heater which is used to raise the temperature of the liquids to be sprayed and which is arranged intermediate the supply source (containers) of the liquids and the location at which the discharge of the liquids occurs (spray gun).

It is well understood that instead of both solutions only one of them may be caused to pass through the heater which must be then sufficiently heated beyond the temperature of approximately 180° F. in order to compensate for that flow of liquid solution which is not passing through and not in contact with the heater.

It has been found that the working temperature when increased to 130° F. or 150° F. does not lead to any appreciable results in the above mentioned silver nitrate solution and the diluted liquid formaldehyde solution as a reducing agent, since the silverized surface disintegrates easily which is probably due to changing of the structure of the silver particles. Practical tests have further shown that the concentration of silver nitrate solution when heated up to approximately 100° F. as working temperature can be decreased up to 50% as compared with silver nitrate solutions which were not subjected to a pre-heating step.

Instead of a diluted solution of liquid formaldehyde glycoxol has shown good results as a reducing agent in connection with an ammoniated silver nitrate solution. Instead of silver nitrate copper sulfate or copper nitrate may be used as a metallic solution for deposit on the non-conductive surface, which may be wax, plastic, or the like.

It can thus be seen that there has been provided according to this invention an apparatus for treating a non-conductive surface with an electrically conductive stratum for electroplating action which apparatus permits the spraying of a sensitizing solution against said surface to make the same receptive for the ensuing spraying operation and then supplying to said surface separate jets of metallic solution and reducing agent having a critical temperature which is approximately above ordinary room temperature and will be determined by, among other things, the character and melting point of the surface material to be treated, said jets converging toward each other to effect mixing of the liquids in atomized state and substantially at a predetermined distance from the point of contact with the surface being treated, whereby uniform deposit of metallized layer or stratum occurs.

Various changes can be made in the apparatus and in the method of carrying out the invention but it shall be understood that such changes shall be within the spirit and scope of the present invention as defined by the appended claim.

Having thus described the invention, what is claimed as new and desired to be secured by Letters Patent, is:

In combination, a spraying device for the discharge of atomized liquids, respectively consisting of a metallic solution and a reducing solution mixed together before impingement on a surface to be coated, an electrically operated and thermostat-controlled heater including a heater block, respective containers from which said liquid solutions are fed in cold state and by gravity, said heater being disposed intermediate said containers and said spraying device and being equipped with two separate elongated conduit means extending substantially parallel to each other through said heater block to permit passage of separate liquid flows through said heater block and at a temperature avoiding volatilization of said liquid solutions, said spraying device being provided with converging nozzles, respective hose means removably connecting said containers with said conduit means at one end of said heater block and detachably connecting said spraying device with said conduit means at the other end of said heater block, and a supply line for air atomizing said liquid solutions in said nozzles before said liquid solutions are mixed together adjacent said surface whereby the temperature of said mixed atomized liquid solutions is lowered to a degree required for said surface coating and substantially below that of said liquid solutions flowing from said other end of said heater block so that reduction of said metallic solution to the respective metal of said solution occurs uniformly and evenly.

FRED M. NEW.

References Cited in the file of this patent

UNITED STATES PATENTS

| Number | Name | Date |
|---|---|---|
| 1,338,940 | Lindahl | May 4, 1920 |
| 2,136,024 | Schneider | Nov. 8, 1938 |
| 2,355,186 | Tischer | Aug. 8, 1944 |
| 2,366,150 | Yount | Dec. 26, 1944 |
| 2,421,079 | Narcus | May 27, 1947 |
| 2,454,610 | Narcus | Nov. 23, 1948 |
| 2,530,799 | Arvintz | Nov. 21, 1950 |